F. W. EHRLICH.
TIRE OR SHOE HOLDER FOR AUTOMOBILES.
APPLICATION FILED JAN. 4, 1912.

1,155,053.    Patented Sept. 28, 1915.

WITNESSES:
Harry E. Pfeiffer
Fred'k W. Praentzel

INVENTOR:
Frederick W. Ehrlich,
BY
Fraentzel and Richards,
ATTORNEYS

UNITED STATES PATENT OFFICE.

FREDERICK W. EHRLICH, OF NEWARK, NEW JERSEY, ASSIGNOR TO E. A. WHITEHOUSE MFG. CO., A CORPORATION OF NEW JERSEY.

TIRE OR SHOE HOLDER FOR AUTOMOBILES.

1,155,053.   Specification of Letters Patent.   Patented Sept. 28, 1915.

Application filed January 4, 1912. Serial No. 669,421.

*To all whom it may concern:*

Be it known that I, FREDERICK W. EHRLICH, a citizen of the United States, residing at Newark, in the county of Essex and State of New Jersey, have invented certain new and useful Improvements in Tire or Shoe Holders for Automobiles; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention relates, generally, to improvements in tire-carriers for auto-vehicles and the like; and, the present invention has reference, more particularly, to a novel construction of device for carrying extra tires or shoes of pneumatic tires, and supporting the same upon some convenient part of the vehicle, such as the running-board of an automobile.

The present invention has for its principal object to provide a novel and simply constructed and easily operated device for carrying automobile-tires or the shoes therefor, the same being adjustable, so as to be readily adapted to carry, and firmly and securely support automobile-tires or the shoes therefor of any and all sizes.

Other objects of the present invention, not at this time more particularly enumerated, will be clearly understood from the following detailed description of the said invention.

With the various objects of the present invention in view, the said invention consists, primarily, in the novel adjustable tire-carrier hereinafter set forth; and, furthermore, this invention consists in the several novel arrangements and combinations of the various devices and parts, as well as in the details of the construction thereof, all of which will be more fully described in the following specification, and then finally embodied in the clauses of the claims which are appended to and which form an essential part of this specification.

The invention is clearly illustrated in the accompanying drawings, in which:—

Figure 1:
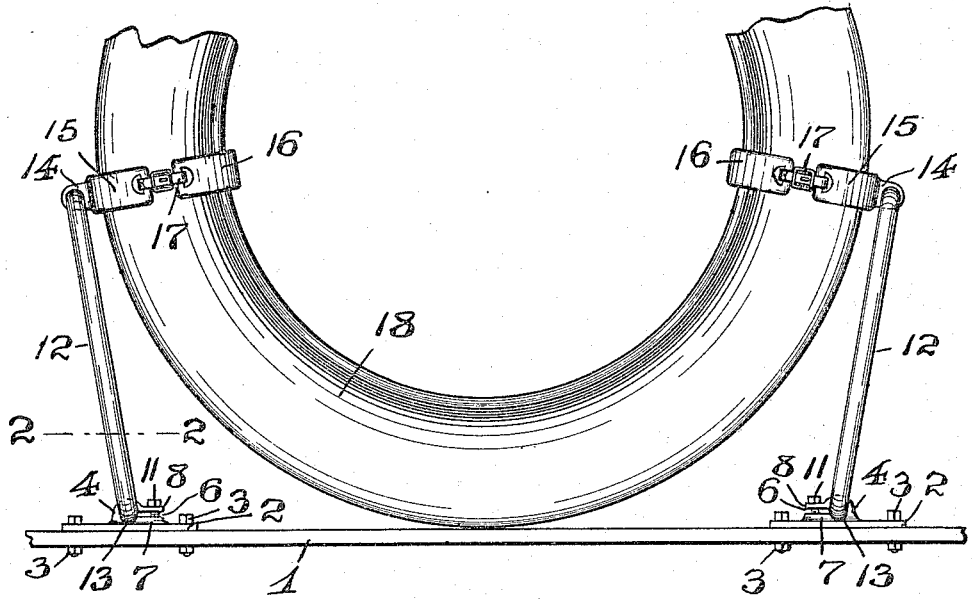
Figure 2:
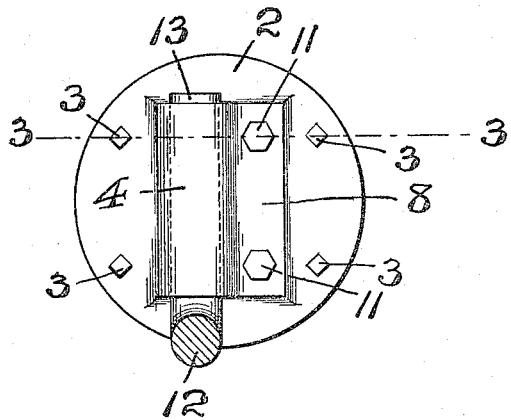
Figure 3:
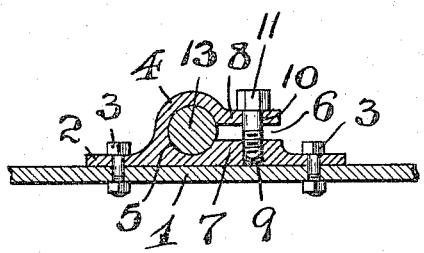

Figure 1 is a side elevation of a tire-carrier or holder made according to and embodying the principles of the present invention, the same being shown in its proper connection with relation to the running board or other suitable part of an automobile, and having an automobile tire-shoe illustrated in its supported relation thereto. Fig. 2 is a detail horizontal transverse section taken on line 2—2 in said Fig. 1, looking downwardly, said view being drawn on an enlarged scale; and Fig. 3 is a detail vertical section, taken on line 3—3 in said Fig. 2, looking in the direction of the arrow.

Similar characters of reference are employed in all of the hereinabove described views, to indicate corresponding parts.

Referring now to the said drawings, the reference-character 1 indicates the running board of an auto-vehicle, the same being a suitable place for locating thereon the novel tire-carrier or holder made according to and embodying the principles of the present invention. The said tire-carrier comprises a pair of supporting elements or base-plates 2, which are suitably spaced apart upon the running board and are firmly secured thereto by means of bolts 3, or any other suitable fastening means. Each of said base-plates 2 is provided with a suitably disposed socket-like member 4 providing a receiving portion 5 of cylindrical or tubular conformation. Each socket-member 4 is provided with a "split" or opening 6 extending throughout its length and in communication with said receiving portion 5, thus forming at one side of each socket-member, a reinforced projection 7, located at one side of said "split" or opening 6, and a tongue or lug 8 located at the upper and other or opposite side of said "split" or opening 6. In this manner, said socket-members and their receiving-portions are provided with a clamping action or function. Said reinforced projection 7 is provided with one or more suitably disposed internally screw-threaded openings 9, and said tongue or lug 8 is provided with one or more suitable perforations 10, the same permitting the passing of lock-screws 11 through said tongue or lug, so that the screw-threaded shanks of said screws may be screwed into the said internally screw-threaded openings 9 of said projection 7, and whereby the clamping action of said socket-member and its receiving portion is obtained.

The reference-character 12 indicates upright standards or arms adapted to be adjustably related to and supported by said socket-members, each standard or arm 12 being provided with a foot-piece, as 13, which extends preferably at right angles to the main portion of the standard 12, and each foot-piece being adapted to be received in the receiving-portion 5 of each socket-members 4, being oscillatorily arranged therein and being adapted to be fixed in variously adjusted positions, as will be evident.

Suitably secured to the upper free end of each standard or arm 12, by means of a perforated ear 14, or in any other suitable manner, is a tire-receiver, each tire-receiver comprising suitably formed yoke-shaped members or pieces, as 15 and 16, the one pair of free ends of which are pivotally connected in the usual and well-known manner, this means of connection therefore not being shown in the accompanying drawings; and the said members 15 and 16 being suitably connected at their other ends by means of retaining-straps 17, or in any suitable manner, so as to be adapted to be arranged about and hold the automobile tire or shoe in place for future use, as will be clearly evident.

It will be clearly evident, that said standards or arms 12 may be moved in directions either away from or toward each other, so as to space the said tire-receivers, carried thereby, farther apart or close to each other, whereby said tire-receivers or holders may be properly adjusted to automobile-tires or shoes of large or small diameters, or of any size; and, when said standards or arms are so spaced, to cause the same to assume their proper adjusted positions with relation to the size of the tire or shoe desired to be carried, said standards or arms being clamped in such adjusted positions, and rigidly retained therein by the clamping action of said socket-members 4 upon the foot-pieces or members 13 of the standards 12 when the bolts or screws are tightened.

I am aware, that changes may be made in the various arrangements and combinations of the several devices and parts, as well as in the details of the construction of the said parts without departing from the scope of the present invention as set forth in the foregoing specification, and as defined in the claims which are appended thereto. Hence, I do not limit my invention to the exact arrangements and combinations of the various devices and parts as described in the said specification, nor do I confine myself to the exact details of the construction of the said parts, as illustrated in the accompanying drawings.

I claim:—

1. In a tire-carrier, the combination with a pair of "split" receiving sockets adapted to be spaced apart and alined with each other on the running board or other convenient part of an automobile, of a pair of standards, said standards each having a foot-piece extending at right angles from its lower end and adapted to be received in said receiving sockets to pivotally and adjustably mount said standards so that their upper ends may be swung away from or toward each other, clamp-screws for binding said "split" receiving sockets about said foot-pieces to rigidly hold said standards in desired adjusted positions, tire-embracing devices pivotally connected with the upper ends of said standards so as to be adjustable to the tire to be embraced thereby and to the angular disposition of said standards when adjusted to the diameter of said tire, and means for holding said tire-embracing devices in engagement with said tire.

2. In a tire-carrier, the combination with a pair of "split" receiving sockets adapted to be spaced apart and alined with each other on the running board or other convenient part of an automobile, of a pair of standards, said standards each having a foot-piece extending at right angles from its lower end and adapted to be received in said receiving sockets to pivotally and adjustably mount said standards so that their upper ends may be swung away from or toward each other, clamp-screws for binding said "split" receiving sockets about said foot-pieces to rigidly hold said standards in desired adjusted positions, tire-embracing devices and means for holding said tire-embracing devices in engagement with said tire.

In testimony, that I claim the invention set forth above I have hereunto set my hand this 29th day of Dec. 1911.

FREDK. W. EHRLICH.

Witnesses:
 FREDK. C. FRAENTZEL,
 FRED'K H. W. FRAENTZEL.